(12) United States Patent
Endo

(10) Patent No.: US 8,023,050 B2
(45) Date of Patent: Sep. 20, 2011

(54) OPTICAL DEVICE AND PROJECTOR

(75) Inventor: Takashi Endo, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 247 days.

(21) Appl. No.: 12/202,892

(22) Filed: Sep. 2, 2008

(65) Prior Publication Data

US 2009/0066860 A1 Mar. 12, 2009

(30) Foreign Application Priority Data

Sep. 12, 2007 (JP) ................. 2007-236293

(51) Int. Cl.
*G02F 1/1335* (2006.01)
(52) U.S. Cl. .................................... 349/5; 349/121
(58) Field of Classification Search .............. 349/5, 121
See application file for complete search history.

(56) References Cited

U.S. PATENT DOCUMENTS

| | | | |
|---|---|---|---|
| 4,889,412 A | 12/1989 | Clerc et al. | |
| 6,624,862 B1 * | 9/2003 | Hayashi et al. | 349/119 |
| 7,570,328 B2 | 8/2009 | Haruyama | |
| 2003/0169391 A1 * | 9/2003 | Uchida et al. | 349/130 |
| 2005/0062918 A1 * | 3/2005 | Usukura et al. | 349/121 |
| 2006/0092358 A1 * | 5/2006 | Fujii et al. | 349/119 |
| 2008/0278668 A1 | 11/2008 | Haruyama | |
| 2009/0219476 A1 * | 9/2009 | Tasaka et al. | 349/144 |

FOREIGN PATENT DOCUMENTS

| | | |
|---|---|---|
| JP | A 2001-42314 | 2/2001 |
| JP | A 2001-117087 | 4/2001 |
| JP | A 2001-343623 | 12/2001 |
| JP | A-2002-182213 | 6/2002 |
| JP | A 2003-121807 | 4/2003 |
| JP | A 2005-316241 | 11/2005 |
| JP | A 2006-11298 | 1/2006 |
| JP | A-2006-78637 | 3/2006 |
| JP | A 2006-215127 | 8/2006 |

* cited by examiner

*Primary Examiner* — Mark Robinson
*Assistant Examiner* — Jerry Blevins
(74) *Attorney, Agent, or Firm* — Oliff & Berridge, PLC

(57) ABSTRACT

An optical device includes a vertically aligned liquid crystal cell that holds a liquid crystal material, a compensating element made of a negative uniaxial refractive material having an optical axis tilted with respect to a system optical axis, and having a fixed positional relation with the liquid crystal cell, an adjustment element having a planar shape and a phase difference in a plane perpendicular to the system optical axis, and a rotary adjustment mechanism that rotates the adjustment element in the plane perpendicular to the system optical axis to adjust the phase difference influencing light transmitted through the adjustment element.

10 Claims, 7 Drawing Sheets

OPTICAL DEVICE AND PROJECTOR

BACKGROUND

1. Technical Field

The present invention relates to an optical device provided with a vertically aligned liquid crystal panel and a phase compensating element, and a projector incorporating the optical device.

2. Related Art

As past liquid crystal projectors, there have been projectors for forming image light by controlling transmitted light with liquid crystal light valves each provided with a pair of polarization plates disposed in front of and behind a liquid crystal panel. Further, as such a projector, there has been a projector using a negative uniaxial compensating element, for example, for view angle compensation of the vertically aligned (VA) liquid crystal panel (see e.g., JP-A-2006-11298 and U.S. Pat. No. 4,889,412).

However, the compensation principle using the negative uniaxial compensating element for the VA liquid crystal with pretilt requires a space for tilting the element, which causes problems such that fine adjustment after combining the RGB pixels causes pixel misalignment, or that the integration with the liquid crystal panel is not achievable. All of the problems described above are caused by the fact that the negative uniaxial compensating element must be tilted.

In more specific explanations, in the case in which the VA liquid crystal panel is compensated with the negative uniaxial compensating element, it is required in principle to align the pretilt of the liquid crystal with the optical axis of the compensating element with good accuracy. However, since manufacturing variations existing in pretilt of liquid crystal is larger than the required adjustment accuracy, as a result, there arises necessity of tilting the compensating element to fit the pretilt of each of liquid crystal members. As described above, adjustment by tilting the compensating element requires the space for the tilt. Further, even if the adjustment of the tilt of the compensating element is possible, there is caused the pixel misalignment by the thickness of the compensating element in the three LCD projectors after adjusting positions of the pixels of the respective liquid crystal members. Still further, although it is desirable to integrate the compensating element and the liquid crystal panel also from a viewpoint of space saving, if the tilt adjustment is executed individually for each of the liquid crystal panels, the integration can hardly be realized.

SUMMARY

An advantage of some aspects of the invention is to provide an optical device capable of performing compensation of phase shift caused by the pretilt and the variation of the pretilt of the VA liquid crystal panel in a simple and easy way without fail.

Further, another advantage of some aspects of the invention is to provide a projector equipped with the optical device as described above.

An optical device according to an aspect of the invention includes (a) a vertically aligned liquid crystal cell for holding a liquid crystal material, (b) a compensating element made of a negative uniaxial refractive material having an optical axis tilted with respect to a system optical axis, and having a fixed positional relation with the liquid crystal cell, (c) an adjustment element having a planar shape and a phase difference in a plane perpendicular to the system optical axis, and (d) a rotary adjustment mechanism for rotating the adjustment element in the plane perpendicular to the system optical axis to adjust the phase difference influencing light transmitted through the adjustment element.

The optical device described above is composed of two compensating elements, namely a compensating element made of a negative uniaxial refractive material having a tilted optical axis, and an adjustment element having a phase difference in a plane perpendicular to the system optical axis. The latter adjustment element is a positive or negative uniaxial adjustment element having an optical axis in a plane perpendicular to the system optical axis described above, for example. The adjustment element can be rotary-adjusted in the plane perpendicular to the system optical axis by the rotary adjustment mechanism, and is capable of performing compensation of the phase corresponding to the variation in the pretilt between the liquid crystal cells. In other words, if deviation in the phase state is caused by the variation in the pretilt of the liquid crystal cell, by further compensating the liquid crystal cell, which is typically compensated by the negative uniaxial compensating element, by the adjustment element, it becomes possible to align the refractive index anisotropy of the liquid crystal cell in a desired direction, specifically in a polarization directions of the incident light or the emitted light, thus preventing the apparent refractive index anisotropy from being caused in the liquid crystal element. Thus, it becomes possible to prevent the degradation of the contrast of the projection light to reduce the color shading. It should be noted that since the adjustment element has a planar shape having a light entrance surface and the light exit surface parallel to a plane perpendicular to the system optical axis, and rotates in the plane perpendicular to the system optical axis, the pixel misalignment caused by the adjustment can be prevented from occurring.

Further, according to a specific aspect or a viewpoint, in the optical device described above, the compensating element is a sapphire plate adhering to the liquid crystal cell. In this case, the liquid crystal element, which is heated, can more efficiently be cooled by sapphire having generally higher thermal conductivity than glass or quartz.

Further, according to another aspect of the invention, the adjustment element is a plate-like member having an optical axis extending in a direction parallel to a plane perpendicular to the system optical axis. In this case, the phase shift in the polarization direction can surely be compensated.

Further, according to another aspect of the invention, the adjustment element is disposed on an entrance side of the liquid crystal cell. In this case, by disposing the adjustment element on the entrance side of the liquid crystal cell, the space for rotating the adjustment element can surely be provided.

Further, according to another aspect of the invention, a first polarization plate disposed on the entrance side of the liquid crystal cell, and a second polarization plate disposed on an exit side of the liquid crystal cell are further provided. In this case, by providing the polarization plates on the entrance side and the exit side of the liquid crystal cell, the light with the same polarization direction can be transmitted.

A projector according to another aspect of the invention includes (a) the optical device for light modulation described above, (b) a light source for generating light for illuminating the optical device, and (c) a projection optical system for projecting light output from the optical device.

In the projector described above, since the optical device is composed of the two compensating elements, namely the compensating element made of the negative uniaxial refractive material having the tilted optical axis, and the adjustment element having the phase difference in the plane perpendicular to the system optical axis, the variation in the birefringence of the VA liquid crystal panel can be compensated by rotary-adjusting the adjustment element in the plane perpendicular to the system optical axis. Thus, it becomes possible to prevent the degradation of the contrast of the projection light to reduce the color shading.

BRIEF DESCRIPTION OF THE DRAWINGS

The invention will now be described with reference to the accompanying drawings, wherein like numbers reference like elements.

DESCRIPTION OF EXEMPLARY EMBODIMENTS

First Embodiment

Figure 1:
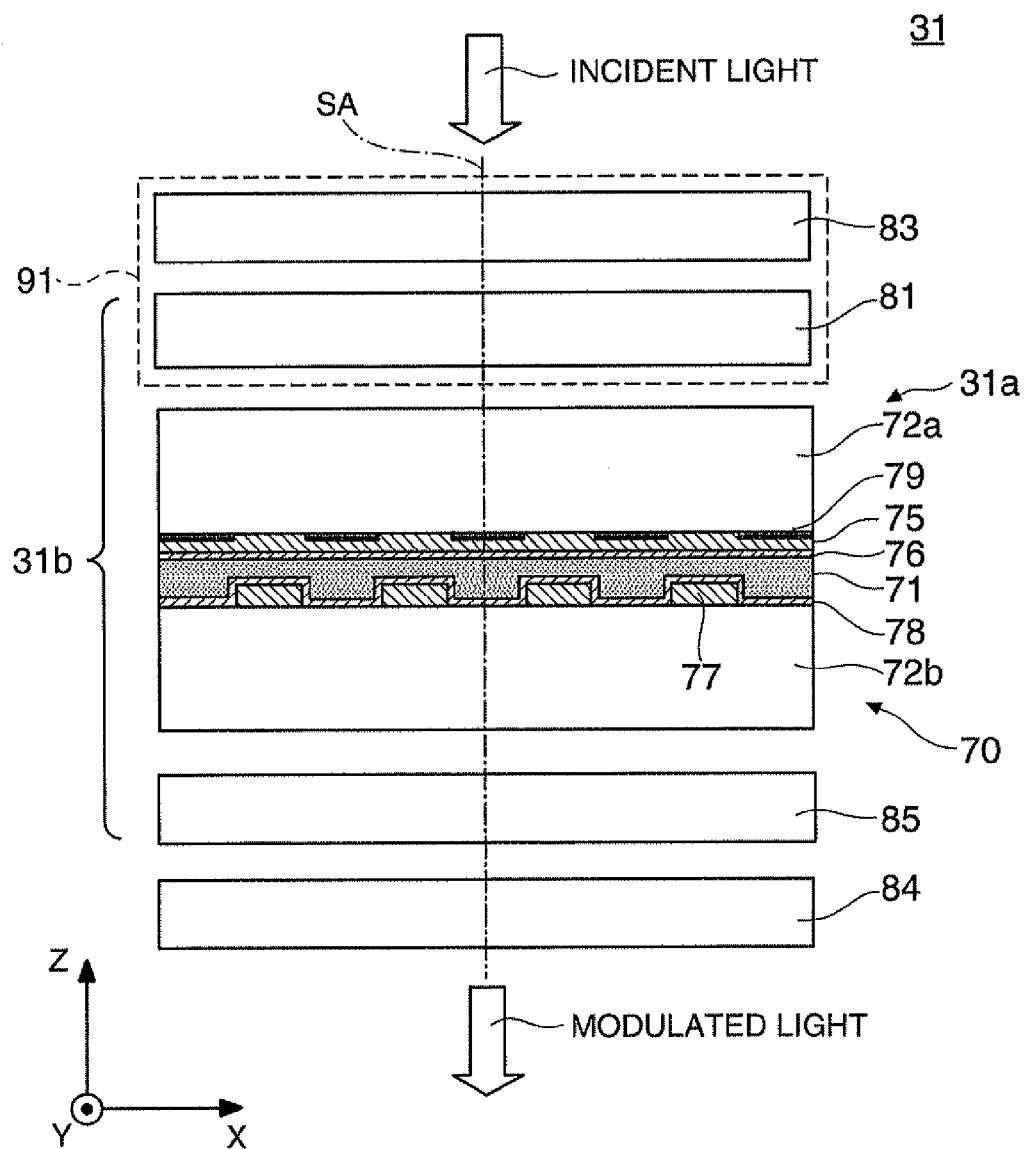
FIG. 1 is an enlarged cross-sectional view for explaining a structure of a liquid crystal light valve as an optical device according to a first embodiment of the invention.
Figure 2:
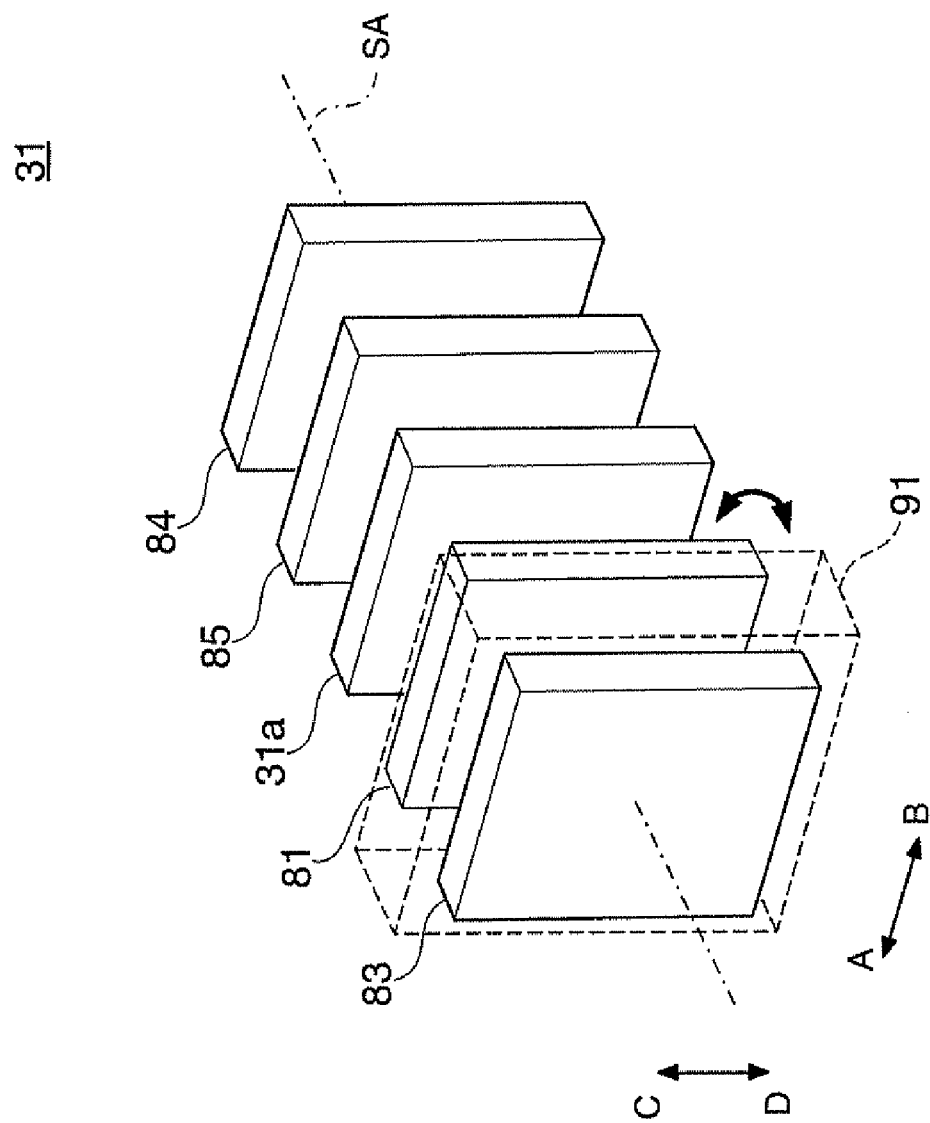
FIG. 2 is a conceptual diagram for explaining a configuration of the liquid crystal light valve shown in FIG. 1.

FIG. 1 is an enlarged cross-sectional view for explaining a structure of a liquid crystal light valve as an optical device according to the first embodiment of the invention, and FIG. 2 is a conceptual diagram for explaining a configuration of the liquid crystal light valve.

As shown in FIGS. 1 and 2, the liquid crystal light valve 31 is provided with a first polarization plate 83, a first compensating element 81, a liquid crystal panel 31a, a second compensating element 85, a second polarization plate 84, and a rotary adjustment mechanism 91. Here, the first compensating element 81, the liquid crystal panel 31a, and the second compensating element 85 form a liquid crystal device 31b for changing the polarization state of the incident light into a desired state.

In the liquid crystal light valve 31 shown in the drawing, the first polarization plate 83 on the entrance side and the second polarization plate 84 on the exit side form a cross-Nicol arrangement. The liquid crystal device 31b held between the first and second polarization plates 83, 84 change the polarization direction of the incident light pixel by pixel in accordance with an input signal. The first polarization plate 83, the first compensating element 81, the liquid crystal panel 31a, the second compensating element 85, and the second polarization plate 84 each have the light entrance surface and the light exit surface in the condition parallel to the X-Y plane perpendicular to the Z direction along the system optical axis SA, and arranged closely to each other in the Z direction.

The liquid crystal panel 31a is, for example, a light transmissive modulation device (i.e., vertically aligned light transmissive liquid crystal panel) operating in a vertical-alignment mode, and is provided with a transparent first substrate 72a on the entrance side and a transparent second substrate 72b on the exit side across a liquid crystal layer 71.

On the surface of the first substrate 72a facing the liquid crystal layer 71, there is provided a transparent common electrode 75, on which an oriented film 76, for example, is formed. Meanwhile, on the surface of the second substrate 72b facing the liquid crystal layer 71, there are provided a plurality of transparent pixel electrode 77 arranged in a matrix, and thin film transistors (not shown) electrically connected respectively to the transparent pixel electrodes 77, on which an oriented film 78 is formed, for example. Here, the first and second substrates 72a, 72b, the liquid crystal layer 71, the electrodes 75, 77 disposed therebetween form a liquid crystal cell 70 for changing the phase state, namely the polarization state of the incident light. Further, each of the pixels forming the liquid crystal cell 70 includes one of the pixel electrodes 77, the common electrode 75, and the liquid crystal layer 71 disposed between the pixels. It should be noted that between the first substrate 72a and the common electrode 75, there is disposed a lattice-shaped black matrix 79 so as to separate the pixels.

Here, the oriented films 76, 78 are for arranging the liquid crystalline compounds forming the liquid crystal layer 71 in the necessary directions, have a role of aligning the optical axes of the liquid crystalline compounds so as to have not-so-large but the same tilt with respect to the normal line of the first substrate 72a in the OFF state in which no voltage is applied to the liquid crystal layer 71, and allows the optical axes of the liquid crystalline compounds to be aligned in a specific direction (specifically in the X direction) perpendicular to the normal line of the first substrate 72a in the ON state in which a voltage is applied to the liquid crystal layer 71. Thus, the full light-blocking state (the minimum luminance state) can be assured in the OFF state in which no voltage is applied to the liquid crystal layer 71, and the full transmission state (the maximum luminance state) can be assured in the ON state in which the voltage is applied to the liquid crystal layer 71.

The first and second polarization plates 83, 84 are polarization members for transmitting only the linearly polarized light vibrating in a specific direction, and formed by, for example, drawing a polyvinyl alcohol (PVA) film with dye attached thereto in a specific direction.

The first compensating element 81 is an adjusting element for adjusting the phase state of the light emitted from the liquid crystal device 31b, and disposed between the first polarization plate 83 and the liquid crystal panel 31a. As shown in FIG. 2, the first compensating element 81 is arranged to be rotatable by the rotary adjustment mechanism 91 (described later) for rotating the first compensating element 81 around the system optical axis SA, namely the Z-axis. The first compensating element 81 compensates the phase shift remaining in the liquid crystal layer 71 with no voltage applied thereto in cooperation with the second compensating element 85. The first compensating element 81 is formed of a positive uniaxial refractive material (e.g., quartz crystal), a negative uniaxial refractive material (e.g., sapphire), or an olefinic film provided with a birefringent material by drawing a film made of an olefinic organic material.

Figure 3:
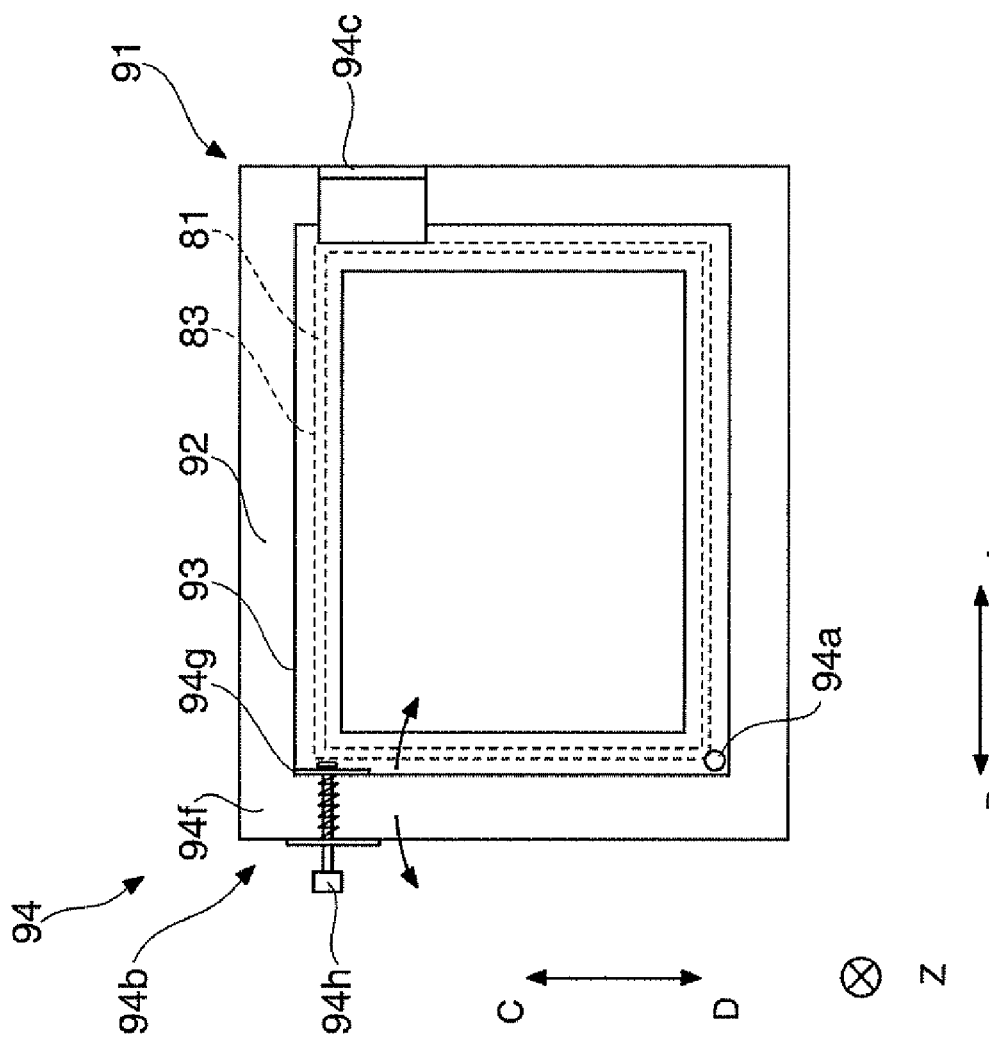
FIG. 3 is a front view for explaining a structure of a rotary adjustment mechanism for rotating a first compensating element.

FIG. 3 is a front view for explaining the structure of the rotary adjustment mechanism 91. The rotary adjustment mechanism 91 is provided with a first holder 92 for holding the first polarization plate 83, a second holder 93 for holding the first compensating element 81, and a adjustment member 94 for adjusting the rotational positions of the first and second holders 92, 93. Here, the adjustment member 94 includes a shaft member 94a for coupling the first and second holders 92, 93, a screw adjustment section 94b for rotating the second holder 93 clockwise and counterclockwise, and a guide 94c fixed to the first holder 92 side, and for guiding the edge portion of the second holder 93. The screw adjustment section 94b is provided with a screw 94h for adjusting the distance between support plates 94f, 94g extending respectively from both of the holders 92, 93. By rotating the screw adjustment section 94b clockwise or counterclockwise, the rotational posture of the second holder 93 with respect to the first holder 92, namely the rotational posture of the first compensating element 81 with respect to the first polarization plate 83, can be fine-adjusted. It should be noted that the rotary adjustment mechanism 91 is nothing more than an exemplification, and various low-profile adjustment mechanisms for fine-turning the first compensating element 81 around the Z-axis can be adopted.

The second compensating element 85 is a negative uniaxial optical element, and is disposed between the liquid crystal panel 31a and the second polarization plate 84. The second compensating element 85 is made of a negative uniaxial refractive material (e.g., sapphire).

Figure 4A:
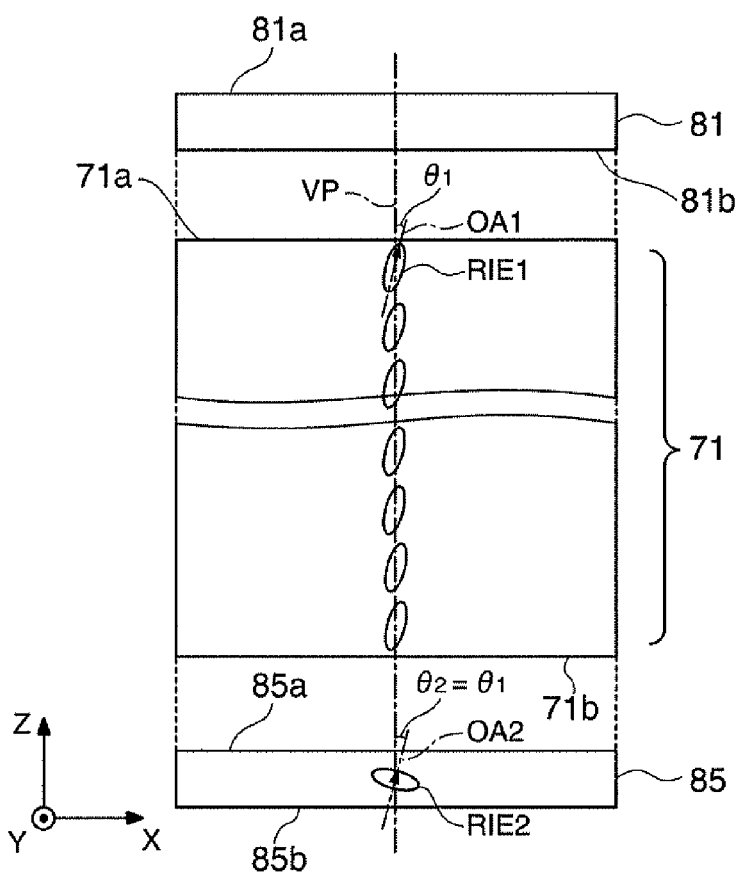
FIG. 4A is a conceptual diagram of a side cross-sectional view for explaining a relationship between the refractive index of a liquid crystal layer and the refractive index of a second compensating element.
Figures 4B, 4C:
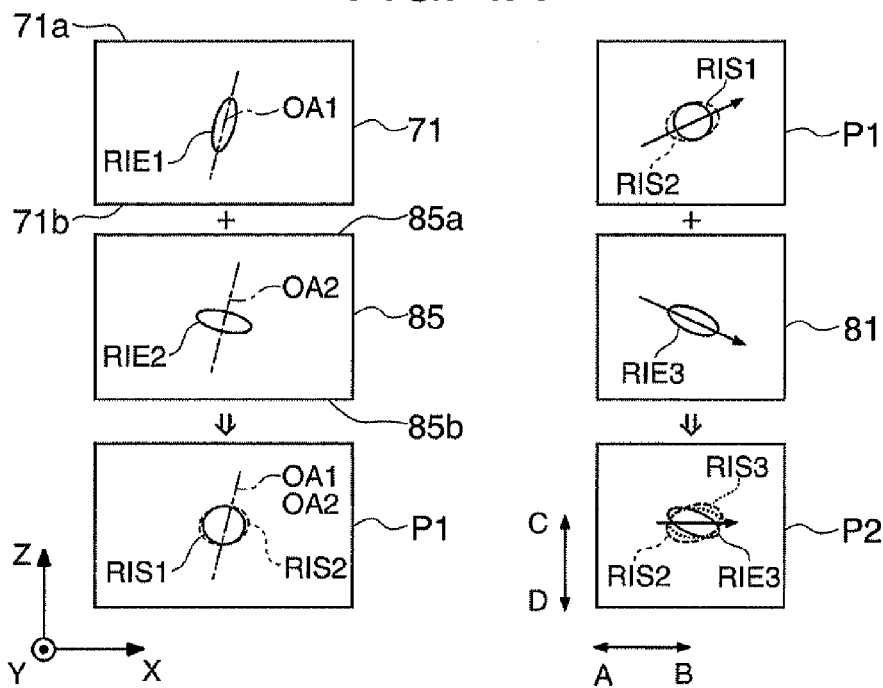
FIG. 4B is a side view for explaining a function of the second compensating element.
FIG. 4C is a plan view for explaining a function of the first compensating element.

FIGS. 4A through 4C are conceptual diagrams for explaining a relationship between the refractive index of the liquid crystal layer 71 and the refractive indexes of the first and second compensating elements 81, 85. FIG. 4A is a conceptual diagram of a side cross-sectional view for explaining a relationship between the refractive index of the liquid crystal layer 71 and the refractive index of the second compensating element 85, FIG. 4B is a side view for explaining a function of the second compensating element 85, and FIG. 4C is a plan view for explaining a function of the first compensating element 81. Here, the light entrance surface 71a and the light exit surface 71b of the liquid crystal layer 71 are arranged to be parallel to each other, and the light entrance surface 85a and the light exit surface 85b of the second compensating element 85 are both disposed in parallel to the light entrance surface 71a of the liquid crystal layer 71. Therefore, the light path VP of the light beam entering the light entrance surface 71a of the liquid crystal layer 71 at right angle thereto is formed perpendicularly to the light entrance surface 85a of the second compensating element 85, and perpendicularly to the light exit surface 85b in the same manner. Further, the light entrance surface 81a and the light exit surface 81b of the first compensating element 81 are also disposed in parallel to the light entrance surface 71a of the liquid crystal layer 71.

As shown in FIG. 4A, in the liquid crystal layer 71, the major axis of a refractive index ellipsoid RIE1 of the liquid crystal compound in the OFF state in which no electrical field is applied, namely the optical axis OA1 has a small but constant tilt angle in the X-Z plane with respect to the Z-axis. In this case, the tilt direction of the refractive index ellipsoid RIE1 is the X direction, and therefore, it is assumed that the x direction is called the orientational direction of the liquid crystal layer 71. Further, the tilt angle of the refractive index ellipsoid RIE1 in the orientational direction is called pretilt angle $\theta_1$. On the other hand, in the second compensating element 85, the refractive index ellipsoid RIE2 corresponds to the negative uniaxial crystalline refractive index ellipsoid, the minor axis thereof, namely the optical axis OA2 has a small but constant tilt angle in the X-Z plane with respect to the Z-axis. In further detailed explanations, the tilt direction of the refractive index ellipsoid RIE2, namely the azimuth thereof, is the X direction similarly to the orientational direction of the liquid crystal layer 71, and the tilt angle $\theta_2$ in the azimuth along which the refractive index ellipsoid RIE2 is tilted is arranged to be equal to the pretilt angle $\theta_1$ provided to the liquid crystal layer 71 with respect to the light path VP of the normal incident light to the light entrance surface 71a. In other words, in consideration of the light beam entering the liquid crystal panel 31a at a certain incident angle, it is arranged that the light beam passing through the liquid crystal layer 71 at a certain angle with the optical axis OA1 passes through the second compensating element 85 at the same angle with the optical axis OA2. It should be noted that the first compensating element 81 has the optical axis in the X-Y plane, and is rotated by the rotary adjustment mechanism 91 around the system optical axis SA parallel to the Z-axis. On this occasion, the first compensating element 81 rotates in the X-Y plane while keeping the optical axis thereof in the state perpendicular to the light path VP.

Hereinafter, the function of the second compensating element 85 will specifically be explained. The upper drawing of FIG. 4B is a side view of the zx plane for explaining the refractive index ellipsoid RIE1 with the pretilt of the liquid crystal layer 71, the middle drawing is a side view of the z-X plane for explaining the refractive index ellipsoid RIE2 of the second compensating element 85, and the lower drawing is a side view of the Z-X plane showing the state in which the influence of the refractive index ellipsoid RIE1 of the upper drawing and the influence of the refractive index ellipsoid RIE2 of the middle drawing are combined at an appropriate ratio so that the both influences compensate for each other.

Firstly, in consideration of the liquid crystal layer 71, the refractive index ellipsoid RIE1 of the liquid crystalline compound is arranged to correspond to the positive uniaxial material. Defining the refractive indexes in the reference axis directions perpendicular to each other as nx, ny, and nz, respectively, the relationship of nx=ny<nz is generally satisfied. The optical axis OA1 corresponding to the major axis of the refractive index nz is in the state tilted as much as the pretilt angle $74_1$ with respect to the light path VP of the light beam (the normal incident light) entering the light entrance surface 71a of the liquid crystal layer 71 in the normal line direction.

Similarly, in consideration of the second compensating element 85, the second compensating element 85 is made of the negative uniaxial refractive material corresponding to the refractive index ellipsoid RIE2. Defining the refractive indexes in the reference axis directions perpendicular to each other as nx, ny, and nz, respectively, similarly to the case described above, the relationship of nx=ny>nz is generally satisfied. The optical axis OA2 corresponding to the minor axis of the refractive index nz is in the state tilted as much as the tilt angle $\theta_2=\theta_1$ with respect to the light path VP of the normal incident light entering the light entrance surface 71a of the liquid crystal layer 71 in the normal line direction.

Here, the major axis of the refractive index nz of the liquid crystal layer 71 and the minor axis of the refractive index nz of the second compensating element 85 are disposed in parallel to each other, and the axis direction of the slow axis and the axis direction of the fast axis are counter changed between the liquid crystal layer 71 and the second compensating element 85. Therefore, when the phase differences in the combination of the liquid crystal layer 71 and the second compensating element 85 with respect to the normal incident light are the same, in the OFF state of the liquid crystal panel 31a, the polarized light entering the second polarization plate 84 becomes the same state as the state of the polarized light emitted from the first polarization plate 83, and the normal incident light is completely blocked by the second polarization plate 84. Thus, the contrast of the image determined by the full transmission state (the maximum luminance state) and the full light-blocking state (the minimum luminance state) of the liquid crystal light valve 31 becomes the maximum.

As described above, the combination P1 of the refractive index of the liquid crystal layer 71 and the refractive index of the second compensating element 85 provide no phase difference to the incident light as an isotropic medium equivalent to the refractive index sphere RIS1. However, the pretilt angle $\theta_1$ provided to the liquid crystal layer 71 usually has a variation caused by the individual difference of the liquid crystal panel 31a, and in some cases, the phase difference remains after the fixed compensation alone by the second compensating element 85. In such cases, the combination P1 of the liquid crystal layer 71 and the second compensating element 85 can be regarded as an anisotropic medium such as the refractive index ellipsoid RIS2 shown in the lower drawing of FIG. 4B. Therefore, the phase difference, as the variation described above, of the anisotropic medium as the combination of the refractive index of the liquid crystal layer 71 and the refractive index of the second compensating element 85 is compensated by the first compensating element 81.

Hereinafter, the function of the first compensating element 81 will be explained. The upper drawing of FIG. 4C is a plan view of the X-Y plane for explaining the combination of the refractive indexes of the liquid crystal layer 71 and the second compensating element 85, the middle drawing is a plan view of the X-Y plane for explaining the refractive index of the first compensating element 81, and the lower drawing is a plan view of the X-Y plane showing the state in which the refractive index ellipsoid RIS2 of the upper drawing and the refractive index ellipsoid RIE3 of the middle drawing are combined at an appropriate ratio so that the both compensate for each other. Here, the axis directions of the refractive index ellipsoids are illustrated with the arrows.

In consideration of the combination P1 of the refractive indexes of the liquid crystal layers 71 and the second compensating elements 85, when there is a variation in the pretilt angle $\theta_1$ of the liquid crystal layer 71, the refractive index ellipsoid RIS2 corresponds to the variation, and the orientations of the tilts with respect to the polarization directions AB and CD are in arbitrary states.

On the other hand, the first compensating element 81 is made, for example, of a positive uniaxial refractive material corresponding to the refractive index ellipsoid RIE3, and defining the refractive indexes in the reference axis directions perpendicular to each other as nx, ny, and nz, respectively, nx=ny<nz is generally satisfied. The first compensating element 81 is rotated by the rotary adjustment mechanism 91 described above to have a necessary angle, and is in a state in which the major axis or the minor axis of the refractive index ellipsoid RIS3 in the XY plane after combining the refractive indexes of the liquid crystal layer 71 and the first and second compensating elements 81, 85, namely the slow axis or the fast axis is adjusted to be identical to the polarization direction AB or CD of the first and second polarization plates 83, 84. Thus, in consideration of the combination P2 of the refractive indexes of the liquid crystal layer 71, the first and second compensating elements 81, 85, in the OFF state of the liquid crystal panel 31a, the polarized light emitted from the first polarization plate 83 and the polarized light entering the second polarization plate 84 become in the same state, thus the normal incident light can completely be blocked by the second polarization plate 84. Thus, the contrast of the image determined by the full transmission state (the maximum luminance state) and the full light-blocking state (the minimum luminance state) of the liquid crystal light valve 31 becomes the maximum.

Hereinafter, a specific example will be explained. As the first compensating element 81 for compensating the phase difference remaining in the vertically aligned liquid crystal layer 71 incorporating the first and second compensating elements 81, 85, quartz crystal was used, and as the second compensating element 85, sapphire was used. The thickness of the first compensating element 81 was set in a range of, for example, about 2 through 10 μm in consideration of workability, and the thickness of the second compensating element 85 was set in a range of, for example, about 20 through 60 μm in consideration of the compensation of the phase difference caused by the pretilt. The rotational angle of the first compensating element 81 was set to be about ±10° when the thickness was 10 nm, or about ±90° when the thickness was 2 nm, for example.

Further, a simulation was conducted regarding the liquid crystal light valve 31 provided with the vertically aligned liquid crystal layer 71, and incorporated the first and second compensating elements 81, 85 described above.

Figure 5A:
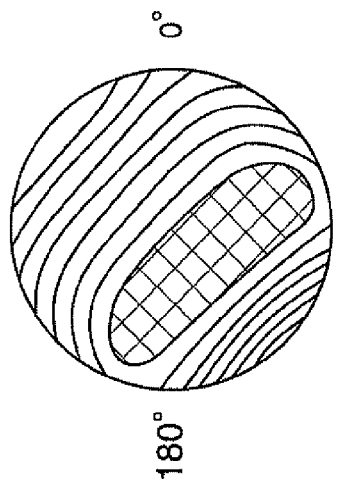
FIGS. 5A through 5D are diagrams showing examples of view angle characteristic by a simulation.
Figure 5B:
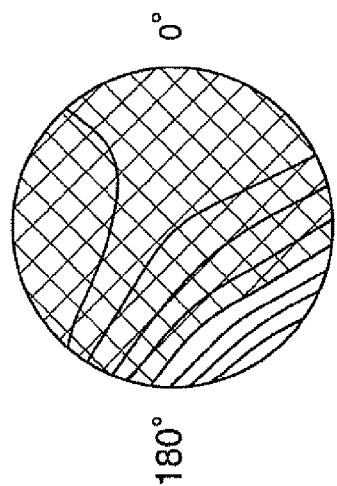
Figure 5C:
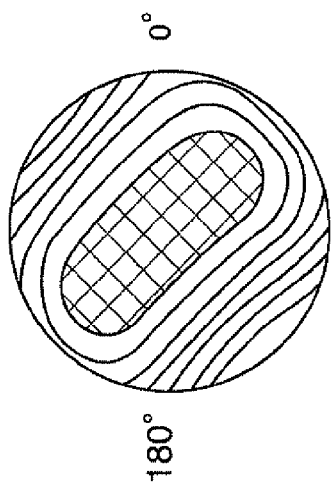
Figure 5D:
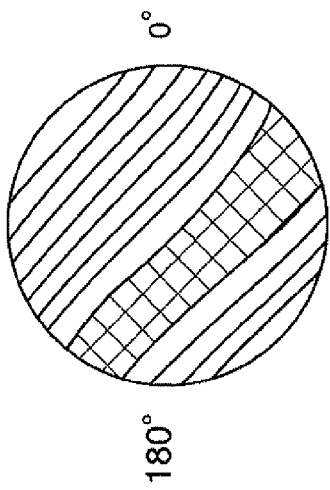

FIGS. 5A to 5D show the results of the simulation carried out with the data corresponding to the specific liquid crystal light valve 31. FIG. 5A shows the view angle characteristic of the liquid crystal light valve 31 with the liquid crystal layer 71 and the second compensating element 85 as designed, FIG. 5B shows the view angle characteristic in the case in which the pretilt of the liquid crystal layer 71 is varied +1° from the designed value, and the second compensating element 85 having the optical axis tilted as designed, FIG. 5C shows the view angle characteristic of the liquid crystal light valve 31 incorporating the first compensating element 81 in the case in which the pretilt of the liquid crystal layer 71 is varied +1° from the designed value, and the second compensating element 85 having the optical axis tilted as designed, and FIG. 5D shows the view angle characteristic of the liquid crystal light valve 31 when the first compensating element 81 is rotationally adjusted in the case in which the pretilt of the liquid crystal layer 71 is varied +1° from the designed value, and the second compensating element 85 having the optical axis tilted as designed.

According to FIG. 5A, the view angle characteristic is made preferable by providing the liquid crystal layer 71 and the second compensating element 85 with the designed values. However, in reality, the variation in the pretilt of the liquid crystal layer 71 exists. For example, in the case in which the pretilt is varied +1° from the designed value, the view angle characteristic is deviated as shown in FIG. 5B. By incorporating the first compensating element 8S in the liquid crystal light valve 31 in the present state, and appropriately adjusting the rotational angle, the relatively preferable view angle characteristic can be obtained as shown in FIG. 5D. This means that by rotating the first compensating element 81 to adjust the phase difference provided to the light transmitted through the first compensating element 81, the phase difference, which is caused by the fact that the tilt of the optical axis of the second compensating element 85 does not correspond to the tilt of the optical axis of the refractive index ellipsoid RIF1 of the liquid crystalline compounds of the liquid crystal layer 71 in the OFF state of the liquid crystal panel 31a owing to the variation in the pretilt of the liquid crystal layer 71, has been compensated.

Figure 6:
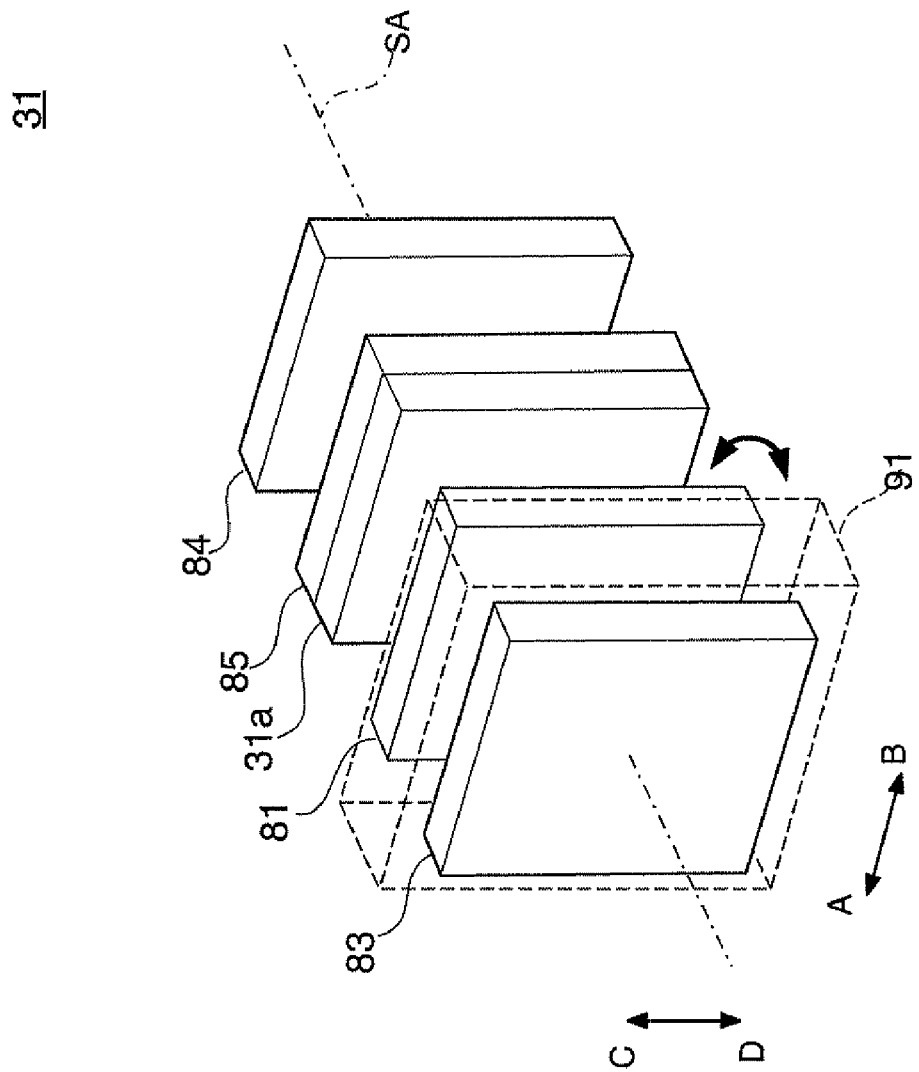
FIG. 6 is a conceptual diagram for explaining a modified example of a structure of the liquid crystal light valve shown in FIG. 1.

It should be noted that in the present embodiment, although the case in which the second compensating element 85 and the liquid crystal panel 31a are disposed with a distance is explained, it is also possible to dispose the second compensating element 85 in contact with the liquid crystal panel 31a as shown in FIG. 6. Thus, in the case in which the second compensating element 85 is made of a crystalline inorganic material with relatively high thermal conductivity such as sapphire, and has a substantial thickness, it is possible to make the second compensating element 85 function as a sort of cooling plate or radiator plate capable of efficiently cooling the liquid crystal panel 31a apt to generate heat by absorbing the incident light.

Second Embodiment

Figure 7:
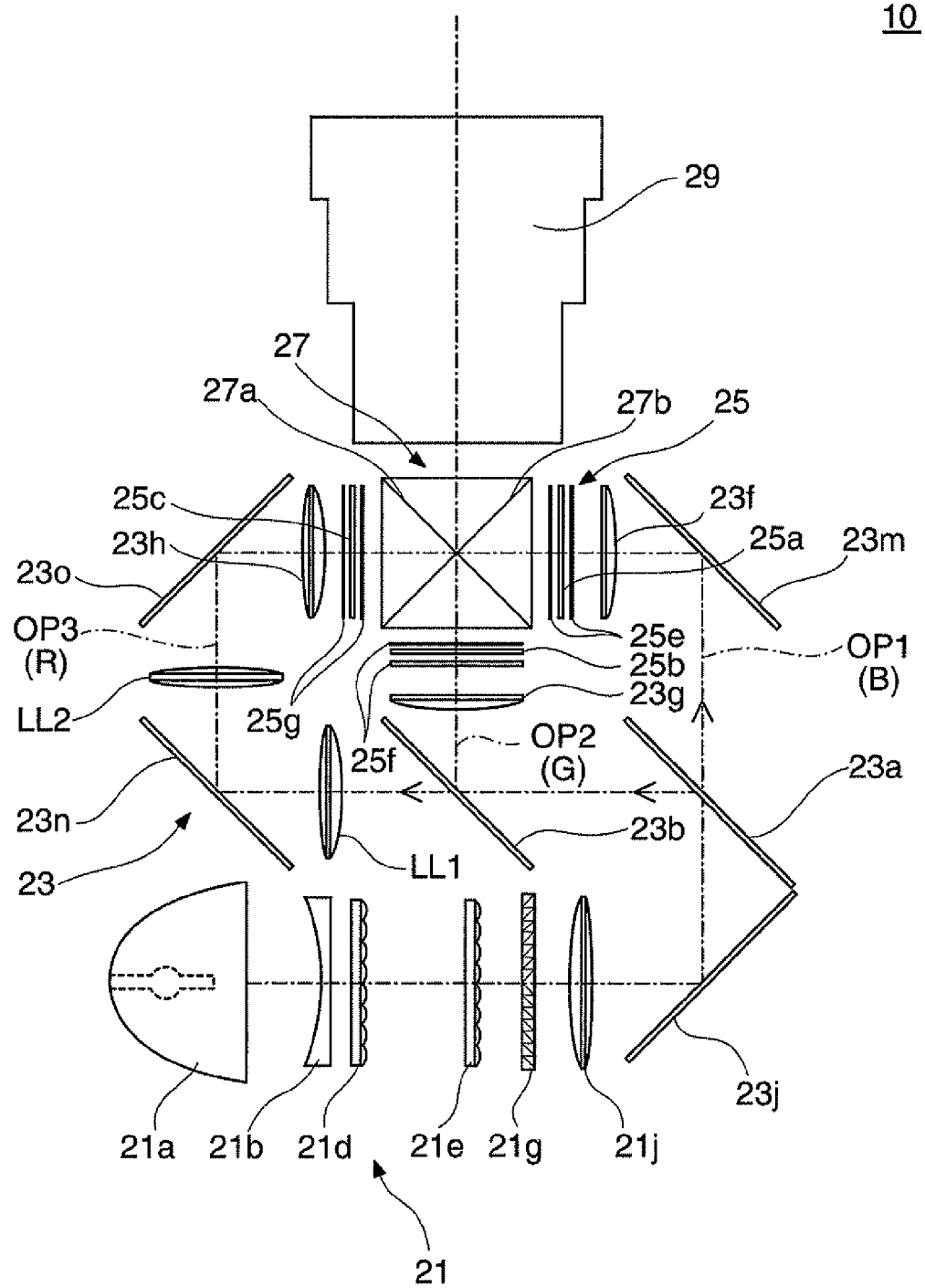
FIG. 7 is a diagram for explaining the configuration of an optical system of a projector incorporating the liquid crystal light valve shown in FIG. 1.

FIG. 7 is a diagram for explaining the configuration of an optical system of a projector incorporating the liquid crystal light valve 31 shown in FIG. 1 or FIG. 6.

The present projector 10 is provided with a light source device 21 for generating source light, a color separation optical system 23 for separating the source light from the light source device 21 into three colors of light, red, green, and blue, a light modulation section 25 illuminated by the illumination light of respective colors emitted from the color separation optical system 23, a cross dichroic prism 27 for combining image light of respective colors from the light modulation section 25, and a projection lens 29 as a projection optical system for projecting the light passing through the cross dichroic prism 27 on a screen (not shown). In the constituents, the light source device 21, the color separation optical system 23, the light modulation section 25, and the cross dichroic prism 27 form the image forming device for forming the image light to be projected on the screen.

In the projector 10 described above, the light source device 21 is provided with a light source lamp 21a, a concave lens 21b, a pair of fly-eye optical systems 21d, 21e, a polarization conversion member 21g, and an overlapping lens 21i. In these components, the light source lamp 21a is formed, for example, of a high-pressure mercury lamp, and is equipped with a concave mirror for collecting the source light to emit it forward. The concave lens 21b, which has a role of collimating the source light from the light source lamp 21a, can also be eliminated. The pair of fly-eye optical systems 21d, 21e is each composed of a plurality of element lenses arranged in a matrix, and divides the source light from the light source lamp 21a passing through the concave lens 21b with these element lenses to be individually collected or diffused. The polarization conversion member 21g converts the source light emitted from the fly-eye optical system 21e into, for example, the light with only the S-polarized component perpendicular to the sheet of FIG. 7, and supplies it to the subsequent optical system. The overlapping lens 21i appropriately collects the illumination light passing through the polarization conversion member 21g as a whole, thereby making it possible to illuminate in an overlapping manner the light modulation devices of respective colors provided to the light modulation section 25. Specifically, the illumination light passing through the both fly-eye optical systems 21d, 21e and the overlapping lens 21i evenly illuminates in an overlapping manner the liquid crystal devices 25a, 25b, and 25c of respective colors disposed in the light modulation section 25 after passing through the color separation optical system 23 described below in detail. Here, the liquid crystal devices 25a, 25b, and 25c are each corresponding to the liquid crystal device 31b shown in FIG. 1 and so on, and has the same structure.

The color separation optical system 23 is provided with first and second dichroic mirrors 23a, 23b, three field lenses 23f, 23g, and 23h as the correction optical system, and reflecting mirrors 23j, 23m, 23n, and 23o, and forms the illumination device together with the light source device 21. Here, the first dichroic mirror 23a reflects, for example, red light and green light, and transmits blue light in the three colors of light of red, green, and blue. Further, the second dichroic mirror 23b reflects, for example, the green light and transmits the red light in the two colors of light of red and green input therein. In the color separation optical system 23, the substantially white source light from the light source device 21 enters the first dichroic mirror 23a with the light path folded by the reflecting mirror 23j. The blue light passing through the first dichroic mirror 23a enters the field lens 23f via the reflecting mirror 23m while staying as, for example, S-polarized light. Further, the green light reflected by the first dichroic mirror 23a, and further reflected by the second dichroic mirror 23b enters the field lens 23g while staying as, for examples S-polarized light. Further, the red light passing through the second dichroic mirror 23b enters the field lens 23h for adjusting the incident angle via the lenses LL1, LL2, and the reflecting mirrors 23n, 23o while staying as, for example, S-polarized light. The lenses LL1, LL2 and the field lens 23h form a relay optical system. The relay optical system has a function of almost directly transmitting the image in the first lens LL1 to the field lens 23h via the second lens LL2.

The light modulation section 25 is provided with three liquid crystal devices 25a, 25b, and 25c, three pairs of polarization plates 25e, 25f, and 25g, disposed on the both sides of the liquid crystal devices 25a, 25b, and 25c, respectively. Here, the liquid crystal device 25a for the blue light disposed on the first optical path OP1 and the pair of polarization plates 25e, 25e disposed on the both sides of the liquid crystal device 25a form a liquid crystal light valve for the blue light for performing the intensity modulation on the blue light two-dimensionally in accordance with the image information. The liquid crystal light valve for the blue light has the same structure as that of the liquid crystal light valve 31 shown in FIG. 1, and has the first compensating element 81 for the contrast adjustment incorporated between the first polarization plate 83 corresponding to one of the pair of polarization plates 25e on the entrance side and the liquid crystal device 25a. Further, the second compensating element 85 for improving the contrast is incorporated between the liquid crystal device 25a and the second polarization plate 84 on the exit side. Similarly, the liquid crystal device 25b for the green light and the corresponding polarization plates 25f, 25f disposed on the second optical path OP2 also form the liquid crystal light valve for the green light, and the liquid crystal device 25c for the red light and the corresponding polarization plates 25g, 25g disposed on the third optical path OP3 also form the liquid crystal light valve for the red light. Further, these liquid crystal light valves for green light and the red light also have the same structure as that of the liquid crystal light valve 31 shown in FIG. 1.

The blue light, which is transmitted through the first dichroic mirror 23a of the color separation optical system 23 to be branched, enters the first liquid crystal device 25a for the blue light via the field lens 23f. The green light, which is reflected by the second dichroic mirror 23b of the color separation optical system 23 to be branched, enters the second liquid crystal device 25b for the green light via the field lens 23g. The red light, which is transmitted through the second dichroic mirror 23b to be branched, enters the third liquid crystal device 25c for the red light via the field lens 23h. Each of the liquid crystal devices 25a through 25c is a passive type light modulation device for modulating the spatial intensity distribution of the incident illumination light, and the three colors of light entering the respective liquid crystal devices 25a through 25c are modulated in accordance with the drive signals or image signals input to the respective liquid crystal devices 25a through 25c as electric signals. On this occasion, the polarization directions of the illumination light entering the liquid crystal devices 25a through 25c are adjusted by the polarization plates 25e, 25f, and 25g, and the component light with predetermined polarization direction is taken out from the modulated light emitted from each of the liquid crystal devices 25a through 25c.

The cross dichroic prism 27 is a light combining member and has a substantially rectangular planar shape formed of four rectangular prisms bonded with each other, and on the interfaces on which the rectangular prisms are bonded with each other, there is formed a pair of dielectric multilayer films 27a, 27b intersecting with each other forming an X-shape. One of the pair of dielectric multilayer films, the first dielectric multilayer film 27a, reflects the blue light while the other of the pair of dielectric multilayer films, the second dielectric multilayer film 27b, reflects the red light. The cross dichroic prism 27 reflects the blue light from the liquid crystal device 25a with the first dielectric multilayer film 27a to emit the blue light rightward in the traveling direction, transmits the green light from the liquid crystal device 25b to emit the green light straight through the first and second dielectric multilayer films 27a, 27b, and reflects the red light from the liquid crystal device 25c with the second dielectric multilayer film 27b to emit the red light leftward in the traveling direction.

The projection lens 29 projects the color image light combined by the cross dichroic prism 27 on the screen (not shown) with a desired magnification. Therefore, a color movie or a color still image corresponding to the drive signals or the image signals input to the respective liquid crystal devices 25a through 25c is projected on the screen with a desired magnification.

Hereinabove, although the invention is explained along the embodiments, the invention is not limited to the embodiments described above, but can be put into practice in various forms within the scope or the spirit of the invention, and the following modifications, for example, are also possible.

Although in the embodiments described above, the quartz crystal plate is used as the first compensating element 81, it is also possible to use a positive uniaxial crystal, an organic material (e.g., liquid crystal or a drawn film), and an evaporated film can be used instead of the quartz crystal plate.

Further, although in the embodiments described above, sapphire is used as the second compensating element 85, it is also possible to use a negative uniaxial material, and a material having the refractive index anisotropy approximated to the negative uniaxial property instead of sapphire. Specifically, inorganic materials such as calcite, potassium dihydrogen (KDP), and ammonium dihydrogen phosphate (ADP) can be used, and various olefinic organic materials can also be used.

Further, although in the embodiments described above, it is assumed that the first compensating element 81 is disposed in parallel to the liquid crystal layer 71, it is also possible that the first compensating element 81 is disposed at a slight angle with the liquid crystal layer 71. On this occasion, the first compensating element 81 is rotated in a plane perpendicular to the system optical axis while maintaining the tilted posture.

Further, although in the projector 10 of the embodiments described above, the light source device 21 is composed of the light source lamp 21a, the pair of fly-eye optical systems 21d, 21e, the polarization conversion member 21g, and the overlapping lens 21i, the fly-eye optical systems 21d, 21e and the polarization conversion member 21g and so on can be eliminated, and the light source lamp 21a can be replaced with another light source such as an LED.

Further, although in the embodiments described above, the color separation of the illumination light is performed using the color separation optical system 23, and after the modulation of each color is performed in the light modulation section 25, the combination of the images of the respective colors is performed in the cross dichroic prism 27, it is also possible to form an image by a single liquid crystal light valve 31.

Although in the embodiments described above, only the example of the projector 10 using three liquid crystal devices 25a through 25c, the invention can be applied to a projector using two liquid crystal devices or a projector using four or more liquid crystal devices.

Although in the embodiments, only an example of the front type of projector for performing projection from the direction in which the screen is observed is cited, the invention can be applied to rear projectors for performing projection from the direction opposite to the direction in which the screen is observed.

The entire disclosure of Japanese Patent Application No. 2007236293, filed Sep. 12, 2007 is expressly incorporated by reference herein.

What is claimed is:

1. An optical device comprising:
   a vertically aligned liquid crystal cell that holds a liquid crystal layer;
   a compensating element made of a negative uniaxial refractive material having an optical axis tilted with respect to a system optical axis, and having a fixed positional relation with the liquid crystal cell,
   an azimuth of the optical axis of the compensating element is the same as an alignment direction of the liquid crystal layer, and
   the optical axis of the compensating element is inclined with respect to a direction in which liquid crystal of the liquid crystal layer is aligned;
   an adjustment element having a planar shape and a phase difference in a plane perpendicular to the system optical axis, the adjustment element being disposed in parallel to the liquid crystal layer; and
   a rotary adjustment mechanism that rotates the adjustment element in the plane perpendicular to the system optical axis to adjust the phase difference influencing light transmitted through the adjustment element, a phase shift of an anisotropic medium as a combination of a refractive index of the liquid crystal layer with no voltage applied thereto and a refractive index of the compensating element in the plane perpendicular to the system optical axis being compensated by the adjustment element.

2. The optical device according to claim 1, wherein the compensating element is a sapphire plate adhering to the liquid crystal cell.

3. The optical device according to claim 1,
   wherein the adjustment element is a plate-like member having an optical axis extending in a direction parallel to a plane perpendicular to the system optical axis.

4. The optical device according to claim 1, wherein the adjustment element is disposed on an entrance side of the liquid crystal cell.

5. The optical device according to claim 1, further comprising:
   a first polarization plate disposed on the entrance side of the liquid crystal cell; and
   a second polarization plate disposed on an exit side of the liquid crystal cell.

6. A projector comprising:
the optical device that modulates light according to claim 1;
a light source that generates the light illuminating the optical device; and
a projection optical system that projects the light output from the optical device.

7. The projector according to claim 6, wherein the compensating element is a sapphire plate adhering to the liquid crystal cell.

8. The projector according to claim 6, wherein the adjustment element is a plate-like member having an optical axis extending in a direction parallel to a plane perpendicular to the system optical axis.

9. The projector according to claim 6, wherein the adjustment element is disposed on an entrance side of the liquid crystal cell.

10. The projector according to claim 6, further comprising:
a first polarization plate disposed on the entrance side of the liquid crystal cell; and a second polarization plate disposed on an exit side of the liquid crystal cell.

* * * * *